United States Patent

[11] 3,585,818

[72] Inventor Dean R. Helble
Hawthorne, Calif.
[21] Appl. No. 875,010
[22] Filed Nov. 10, 1969
[45] Patented June 22, 1971
[73] Assignee North American Rockwell Corporation

[54] OVERRIDING CLUTCH
8 Claims, 8 Drawing Figs.
[52] U.S. Cl. ................................................ 64/30R,
81/52.4, 81/52.35, 173/105, 173/163
[51] Int. Cl. .................................................. F16d 7/02
[50] Field of Search ........................................... 64/30 R, 30
C; 192/56, 150, 56 L; 81/52.4, 52.34; 173/105,
163

[56] References Cited
UNITED STATES PATENTS
3,122,903   3/1964   Ramsden .................... 64/30 C Primary Examiner—Allan D. Hermann
Attorneys—L. Lee Humphries and Charles F. Dischler ABSTRACT: An overriding clutch that disengages at a predetermined load in order to protect the workpiece, the tool, the apparatus, and/or the fastener. Basically, it comprises a toggle-element that, in its normal orientation, assures that the clutch is engaged; but an excessive load pivots the toggle-element to an abnormal orientation that disengages the clutch. Due to design symmetry, the apparatus may be used for both forward and backward motions.

PATENTED JUN22 1971

3,585,818

SHEET 1 OF 3

INVENTOR.
DEAN R. HELBLE

BY
Sidney Magnes

PATENTED JUN22 1971 3,585,818
SHEET 2 OF 3
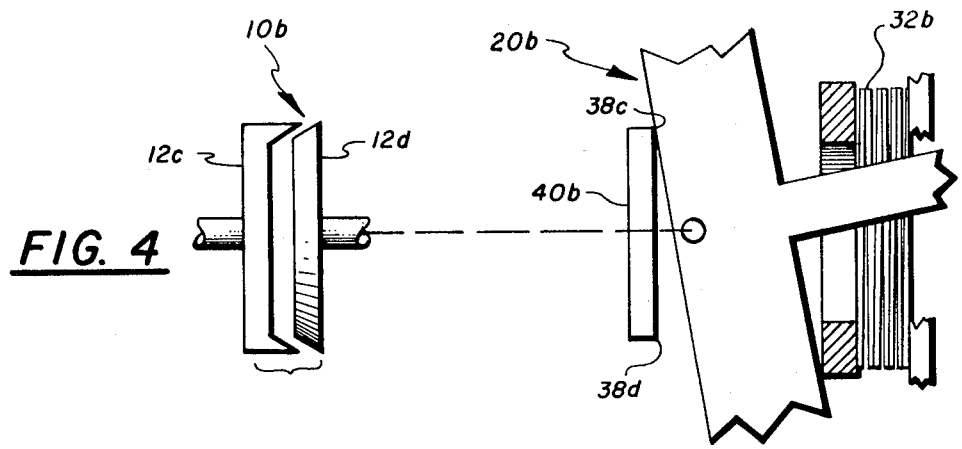
FIG. 4
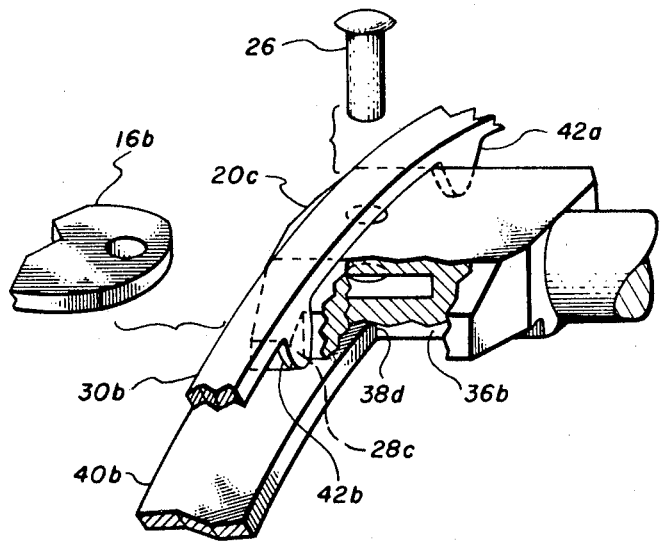
FIG. 5
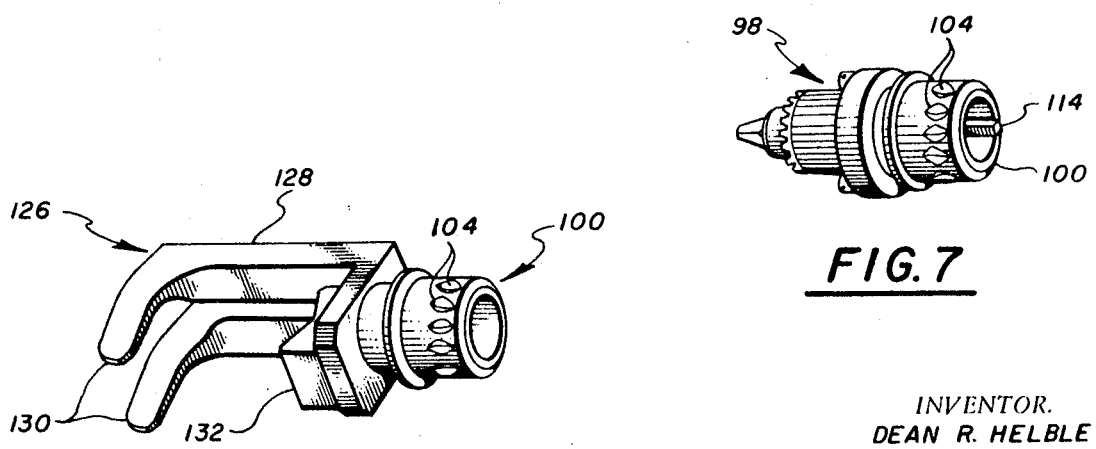
FIG. 7
FIG. 8
INVENTOR.
DEAN R. HELBLE
BY Sidney Magnes

OVERRIDING CLUTCH

BACKGROUND

There are many instances when it is desirable that an excessive load should release a mechanism—for protecting the mechanism, for protecting a workpiece, or for other reasons; and one releasing-device of this type is known as an "overriding clutch." These clutches generally comprise some type of clutch "faces" that may be engaged or disengaged, depending upon load-conditions; and the clutches usually incorporate some type of control-means that controls the engagement/disengagement operation.

While many types of overriding clutches are known, most of them have serious shortcomings; among these being relative inefficiency; the danger of producing clutch-slippage; the lack of reproducibility of the engaging and disengaging points; the danger of overheating; fluid-leakage; etc.

OBJECTS AND DRAWINGS

It is therefore an object of the present invention to provide an improved overriding clutch.

Figure 1:
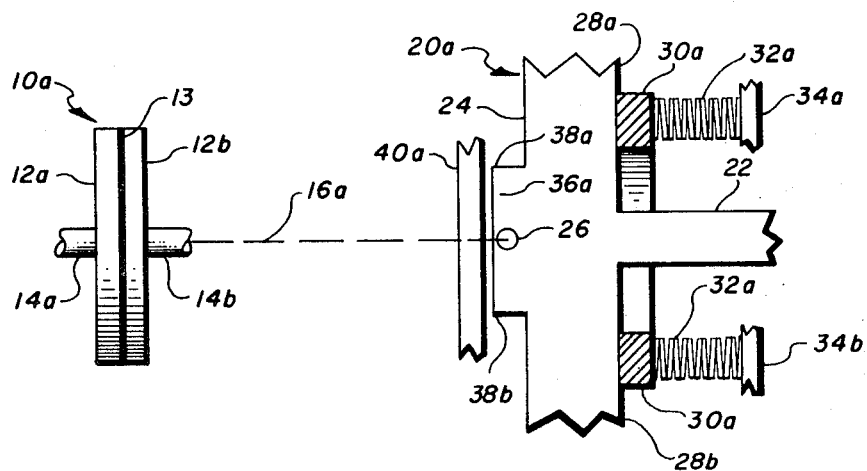
Figure 2:
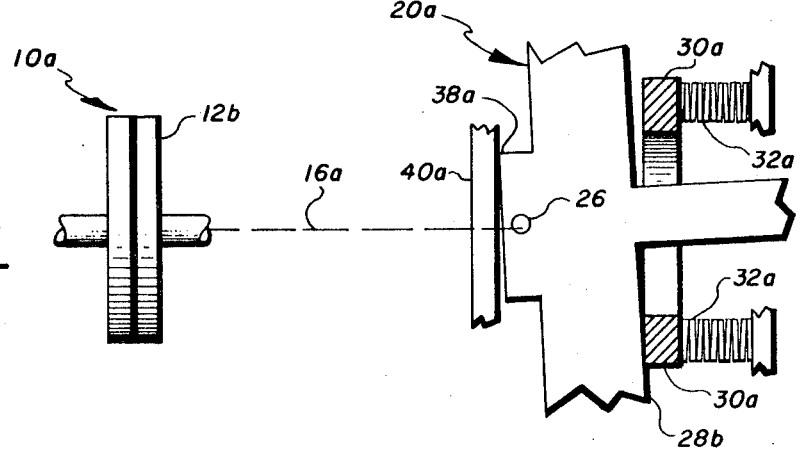
Figure 3:
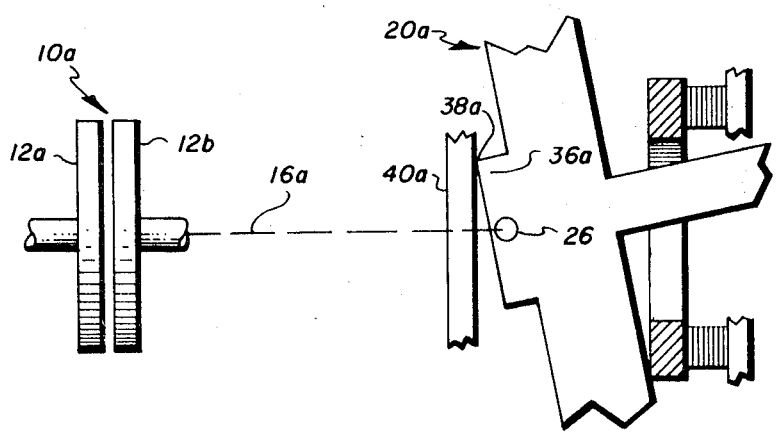
Figure 6:
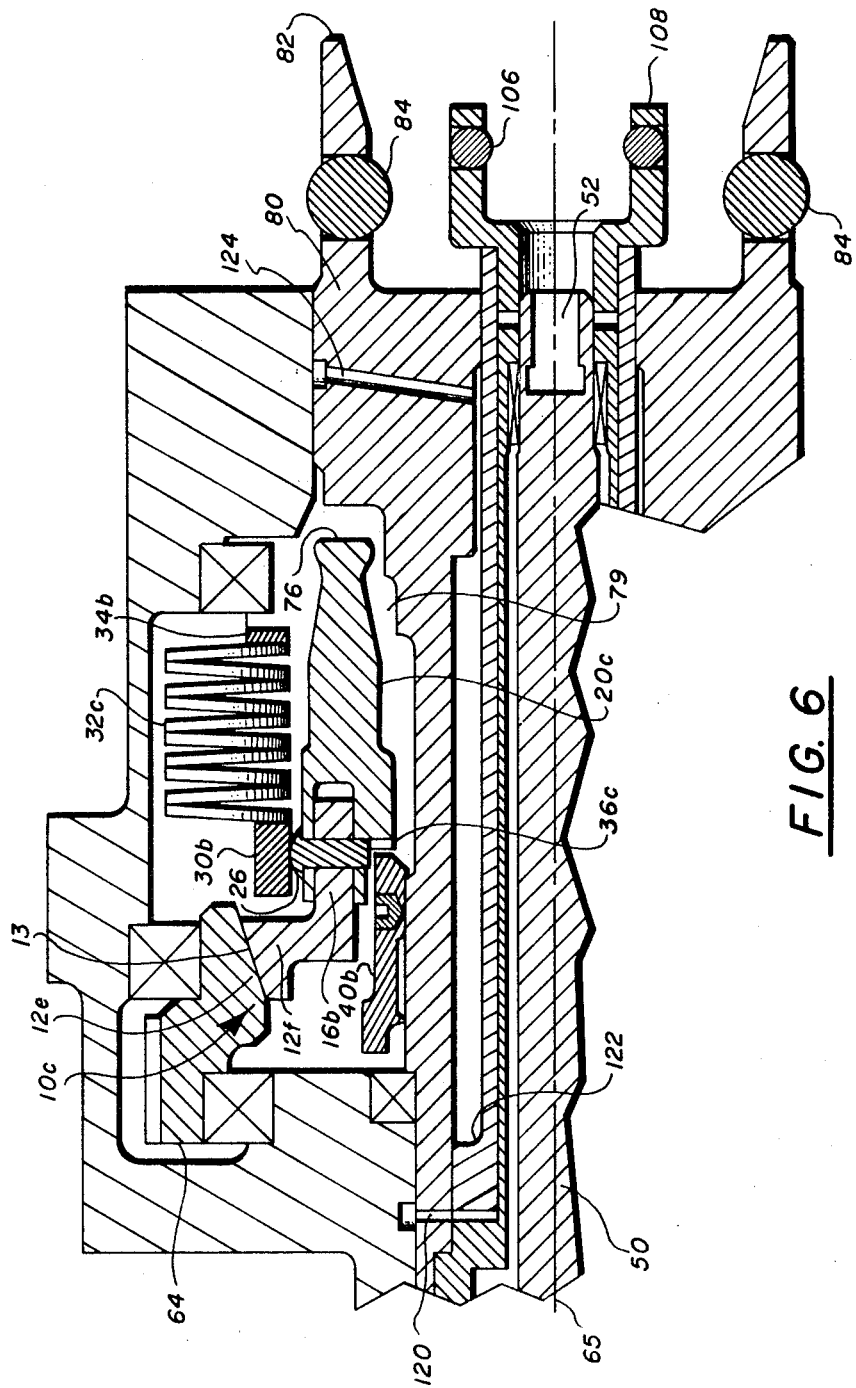

The attainment of this object and others will be realized from the following detailed explanation, taken in conjunction with the drawings of which:

FIGS. 1—3 illustrates the basic clutch operation;
FIG. 4 illustrates another embodiment;
FIG. 5 shows a practical embodiment;
FIG. 6 shows a mechanism embodying the disclosed principles; and
FIGS. 7 and 8 show tools for use with the mechanism of FIG. 6.

THE DISCLOSURE

FIG. 1 is a symbolic representation of an overriding arrangement, showing a clutch 10a having a driving-portion 12a and a driven-portion 12b; these portions being attached respectively to shafts 14a and 14b. In FIG. 1, clutch 10a is shown in its "engaged" position wherein the driving and driven portions 12a and 12b are urged together so that their faces are frictionally engaged at 13, to cause driving-portion 12a to rotate driven-portion 12b.

As will be discussed later, driven-portion 12b has a mechanical linkage attached thereto; linkage 16a being shown in symbolic form in FIG. 1.

FIG. 1 also shows an actuator or "toggle-element" 20a that is illustrated as having a roughly T-shaped configuration; an arm 22 having a crossbar 24 to produce the overall T configuration. Toggle 20a is able to pivot around a pivot-pin 26 that is, in turn, connected by the mechanical-linkage 16a to the driven portion 12b of the clutch.

It will be noted that toggle 20a has a pair of shoulders 28a and 28b that are formed by the crossbar 24; and that a pressure-element 30a is urged against shoulders 28 by resilient means, such as springs 32a that abut a fixedly positioned position-locator 34a and 34b. It will be noted that toggle-element 20a has an abutment-portion 36a having fulcrum-corners 38a and 38b; these and stop-element 40a, shown in FIG. 1, will be discussed later.

To summarize the above apparatus as thus far described, springs 32a urge pressure-element 30a to abut shoulders 28; so that toggle-element 20a assumes a "normal" orientation relative to its pivot-pin 26.

Assume now that an excessive load-situation arises; and that it becomes desirable for clutch 10a to be disengages. This operation will be understood by now referring to FIG. 2.

The undesired load-condition, by means to be discussed later, causes toggle 20a to rotate slightly around its pivot-pin 26, against the force of springs 32a. More specifically, the pivoting reorientation of toggle 20a causes its shoulder 28b to longitudinally move pressure-element 30a to the right, compressing springs 32a to a slight extent. This pivotal movement, however, is very small; and during this pivoting time-interval, the clutch 10a remains engaged; since springs 32a are still pressing on shoulder 28b—thus exerting a leftward force onto pivot-pin 26, linkage 16a, and driven-clutch-member 12b. It should be noted that, up to this time, the pivot-pin, 26 remained in its normal position.

If the undesired load-condition persists, toggle 20a is pivoted farther—as shown in FIG. 2; and eventually fulcrum-corner 38a of the abutment-portion 36a abuts the fixedly positioned stop-element 40a. FIG. 3 shows that, if the undesired load-condition continues, toggle-element 20a now pivots about its fulcrum-corner 38a—rather than about its pivot-pin 26 as previously; and now the entire toggle-element 20a quickly rotates against the force of the springs to the abnormal orientation shown in FIG. 3. It should be noted that now the pivot-pin 26 moves longitudinally to an abnormal position; and under this condition the rapid longitudinal movement of toggle-pin 26, acting through linkage 16a, now abruptly retracts the driven-portion 12b of clutch 10a from the driving-portion 12a; and the clutch thus disengages or "overrides," at the load-condition established by the springs.

It will be noted that just before the clutch disengages (FIG. 2) the pressure between the clutch-facings is slightly larger than normal. (Compare FIG. 2—wherein the springs 32a are additionally compresses—with FIG. 1 wherein the springs are in their normal state.) This slightly larger clutch-pressure is sometimes desirable to avoid clutch-slippage at the release-load condition. If this extra pressure is not desired, the spatial relation between pivot-pin 26, fulcrum-corner 38a, and stop-element 40a can be adjusted to provide clutch-disengagement with minimal spring-compression. The spring-pressure may of course be controlled by spring choice, position-locator 34a, and for the use of suitable shims as well as by other means.

As soon as the clutch is disengaged, the excessive load-condition is removed; and the springs 32a thereupon urge the toggle-actuator 20a to resume its normal orientation, as in FIG. 1. This orientation permits the clutch to again engage; and to resume its normal operation. If however, the load still exceeds the desired limit, the clutch 10a is again disengaged—as described above—to protect the apparatus. In this way the apparatus overrides an excessive load.

FIG. 4 shows a different embodiment, in a position corresponding to that previously discussed in FIG. 3. In FIG. 4, rather than having individual springs, a single overall spring 32b is used. Also toggle-element 20b does not have the previously discussed abutment-portion; rather new fulcrum-corners 38c and 38d now appear at the stop-element 40b. Moreover, the illustration shows a cone-type clutch 10b having a driving-portion 12c and a driven-portion 12d.

The operation is substantially the same as described above.

FIG. 5 shows one practical arrangement of the disclosed apparatus, this being numbered to correspond with the foregoing explanation. In FIG. 5, toggle-element 20c has a slightly different configuration; but still comprises shoulders 28c and 28d (hidden from view), and pivot-pin 26. Linkage 16b is shown to comprise a tongue that fits into the hollowed-out body of toggle-element 20c; and is held by the pivot-pin 26. The pressure-element now takes the form of a substantially circular plate or ring 30b having extending paired ears 42a and 42b that engage paired shoulders 28c and 28d of the toggle-element 20c.

The stop-element now takes the form of a substantially circular plate or ring 40b against which fulcrum-corners 38c (hidden from view) and 38d of the abutment-portion of the toggle-element 36b may pivot. Springs (omitted for clarity) urge pressure-means 30b leftward.

The arrangement of FIG. 5 operates in the same manner as previously discussed.

Because of the symmetry of the disclosed arrangements, the clutch may be disengaged by either clockwise or counter clockwise pivotal movement of the toggle-element; and it will be shown later that this is an extremely valuable feature.

FIG. 6 shows a cutaway view of an operational rotational drive-assembly that contains the overriding clutch arrangement previously described. As will be explained later in greater detail, FIG. 6 shows two separate rotational drives;

(A) a low-torque high-speed rotational-drive, and (B) a high-torque lowispeed rotational-drive. The first drive may be used, for example, for quickly assembling or disassembling structures—such as those comprising bolts, nuts, and the like. The second drive may be used for tightening (or originally loosening) these fasteners, and for other operations to be discussed later.

The Low-Torque Drive

For mechanical reasons the high-speed low-torque arrangement takes the form of an axial shaft 50 that is driven by suitable means, such as an electric or hydraulic motor (not shown); the distal operational end of shaft 50 terminating in a square or hexagonal drive-socket 52 that actually drives a tool—the tools themselves to be discussed later. Since the high-speed low-torque rotational drive 50 is driven directly from a motor, the drive's speed/torque-characteristics are directly related to be speed/torque characteristics of the motor.

The operation may be explained as follows. When a nut is to be driven onto a threaded bolt, shaft 50 is energized by its own motor; and, by use of a suitable tool, quickly spins the nut down to a predetermined "finger" tightness—at which time the motor itself "stall," thus automatically limiting the torque applied to the tool. Since the motor may be chosen to have a relatively low stalling-torque, there is no danger of twisting-off the shaft 50, the drive-socket 52, or the bolt.

It is desirable that the motor be reversible, for either tightening or loosening operations of the type described.

The High-Torque Drive

Once the nut has been "finger-tightened" as discussed above, additional torque may be desirable to tighten it farther; or to loosen it initially. To perform this operation, it is necessary to have a high-torque arrangement. Moreover, the high-torque may inadvertently twist-off the bolt or damage the equipment, an overriding clutch is desirable; and one way of accomplishing this result may be understood from the following description.

In order to obtain a high-torque rotational-drive, the apparatus of FIG. 6 comprises (but is omitted for clarity of illustration) a motor, a worm-gear, and a worm-wheel. As the worm-wheel is rotated, it in turn rotates a torroidal bull-gear 64, shown to to be part of a clutch 10c having a driving-portion 12e and a driven portion 12f; clutch 10c being shown as "closed" or "engaged," so that the driving and driven portions are each pressed against the other portion at clutch-interface 13. Thus, a relatively small, high-speed, low-torque motor can be used to rotate the clutch 10c in a high-torque low-speed manner.

For mechanical reasons, the high-torque rotational-drive is preferably spaced an appreciable distance from the longitudinal axis 65; so bull-gear 64 and clutch 12c take an annular form, with the driven-portion 12f of the clutch having a plurality of peripherally-positioned tongues 16b. (See FIG. 5). While there are several such tongues the operation relating to a single one will be described—the same mode of operation applying to the others.

As the driven-portion 12f of the clutch is rotated, tongue-portion 16b—moving in a peripheral manner—drives its respective pivot-pin 26 in a similar peripheral manner.

The Overriding Clutch

It was indicated that the high-torque arrangement of FIG. 6 used an overriding clutch; and this clutch will now be more fully described in connection with the previously discussed FIGS. 1—5. Referring specifically to FIG. 5, it will be recalled that this assembly used a mechanical-linkage 16b for disengaging the clutch; and in FIG. 6 the mechanical-linkage comprises the tongue-portion 16b of the driven-member of the clutch.

It should be pointed out that in FIG. 6 the high-torque arrangement is concentric with, and circumjacent to the previously discussed low-torque arrangement; so that most of the high-torque elements tend to take the form of rings and/or peripherally positioned members. Therefore, the driven-portion 12f of the clutch has a plurality of individual tongue-elements positioned around its periphery; each of these being associated, as discussed above, with a respective pivot-pin and toggle-element, the toggle-elements being individual T-shaped units having their arms shaped somewhat like a baseball bat.

Pressure-ring 30b is common, and has sets of ears (omitted for clarity) that act simultaneously on all of the toggle-elements; and the spring-array 32c exerts a uniformly distributed force onto the pressure-ring 32b, and—through the paired ears—to the shoulders of the various toggle-elements. Thus, all the toggle-elements are normally axially aligned; and are held in this position by the force of the spring-assembly.

Referring back momentarily to FIGS. 1—5, it will be recalled that pivot-pin 26 coacted with toggle-element 20 and springs 32—forcing the toggle-element to assume a normal orientation; and a similar situation exists in the structure of FIG. 6. Here, pivot-pin 26 coacts with a toggle-element 20c and springs 32c—the coaction forcing the toggle-element 20c to assume a normally axial orientation. In FIG. 6 (which shows the toggle 20c in a side view rather than in the previous top views) pressure-ring 30b has suitably spaced paired ears pressing upon the paired shoulders of toggle-assembly 20c; these ears not being apparent in the drawing, but similar to those shown in FIG. 5.

FIG. 6 shows that pressure-ring 30b reacts with a spring-assembly 32c, such as "Belleville-springs" which in turn are held in position by a locator-ring 34b that may comprise a suitable number of shims or adjustments to provide the desired compression of the Belleville-springs. These Belleville-springs generally take the form of washers that have been pressed into a conical shape; and are frequently also known as "Belleville washers," and as "disc springs." A number of descriptive publications are available—see for example "Disc Springs offer Design Advantages" Modern Machine Shop, May 1967. Of course, other spring-arrays can be used.

A recapitulation is now in order. Under normal conditions, a spring-array 32c transmits a uniformly distributed force to a pressure-ring 30b; this having ears that press upon shoulders of toggle-elements 20c to normally hold a plurality of toggle-elements in a longitudinally orientation. This normal toggle-orientation causes respective pivot-pins 26 to press upon tongues 16b; which in turn urges the driven clutch-member 12f to engage the driving-member 12e of the clutch.

As shown, in FIG. 6, toggle-element 20c fits into a recess 79 of an annular tool-element 80; and the clutch-produced peripheral movement of pivot-pins 26 produces peripheral movement of the plurality of toggle-element. Since the tip-portions 76 of toggles 20 fit snugly into the recess 79, the peripheral movement of toggles 20c cause rotation of annular structure 80 that carries a collet 82 into which a tool is inserted.

To summarize, the high-torque rotational-drive, rotates an overriding clutch that operates through a toggle-arrangement to rotate a collet into which a tool is placed.

OPERATION

The operation of the overriding clutch of FIG. 6 is as follows. Assume, first of all, that the high-torque rotational-drive is being driven in its normal manner; and is final-tightening a nut upon a workpiece; and assume further that the driving-direction is clockwise when looking forward, toward the collet-end. During this time the spring-assembly 32c is in its normally compressed state; and exerts a pressure onto pressure-ring 30b. Since the spring-array 32c is an annular arrangement, and pressure ring- 30b is also an annular arrangement, the pressure on the shoulder-portions of toggles 20 is symmetrical; so that each toggle-element is in a longitudinal orientation.

As the bull-gear 64 rotates, and thus rotates the driven-portion of the clutch, the various circularly positioned tongue-portions 16b (each acting through its respective pivot-pin) peripherally drive respective toggle-assemblies—all the toggles remaining longitudinally oriented.

As indicated above, each toggle-element 20c fits into its respective channel, with the ends of the toggle-elements fitting into the apexes of the channels. Thus, as the plurality of toggle-elements is moved peripherally by the forces applied to their pivot-pins the toggle channel arrangement causes annular element 80 to rotate; which in turn rotates collet 82 and any tool positioned in collet 82.

Assume now that the nut that is being tightened reaches the bottom of its travel; so that its resistance increases, thus applying a resistance (load) on the driving mechanism. This incipient resistance retards the rotation of collet 82, and of annular element 80—and thus causes the movement of the toggle-ends to lag—the curved end-portion of the toggle-elements introducing a rolling effect rather than a sliding frictional effect. However, the movement of the toggle-element-base continues under the influence of the motor and driving gears. Therefore, the toggle-element 20c pivots about its pivot-pin 26 in the manner shown in FIG. 2 (which is a plan view, compared to the side view of FIG. 6).

As discussed in connection with FIG. 2, the first effect of the increased load is to slightly compress the spring-array; but if the load-resistance persists, the situation discussed in connection with FIG. 3 is soon reached. At this time, abutting-member 36c (which is part of toggle 20c of FIG. 6) causes the toggle-element 20c to pivot against stop-ring 40b; so that the resultant longitudinal movement discussed in FIG. 4 is produced—namely, there is a rightward-movement of pivot-pin 26, tongue 16b, and driven-element 12f of the clutch. This rightward movement quickly disengages the interfacing surfaces of the clutch; so that the disengaged clutch does not apply any further torque to the tool and the "bottomed" nut. In this manner the overriding clutch disengages to protect the nut, the bolt, and the driving mechanism from being unduly twisted.

As discussed above, just before the clutch disengages, the clutch-pressure is increased slightly by additional compression of the spring-array; this arrangement having the advantage that it minimizes clutch-slippage just prior to the instant of disengagement. If desired, this additional-pressure feature can be obviated by placing the stop-ring 40b closer to the abutting portion 36c: and this is readily accomplished by threadly mounting stop-ring 40b, so that rotating it will cause it to move forward and backward longitudinally—and it may then be locked in place by any suitable means, such as a set screw. Thus, the stop-element 40 is adjustable—even if fixedly positioned.

Thus, tongues 16 serve a double function: (A) during normal operation they transmit a torque to the tool; and (B) under abnormal operation, they act to quickly retract the driven-portion of the clutch.

Once the clutch has been disengaged, the spring-array reorients the toggle-elements in their normal longitudinal manner; and this toggle-orientation now reengages the clutch. If the load still exceeds the desired value, the clutch is again disengaged.

If desired, the disengaged-clutch condition may be used to produce a visual or an audible signal.

The Tools

As discussed above, the disclosed rotational-drive arrangement may be used in a low-torque mode or in a high-torque mode; and a large variety of tools may therefore be used.

One convenient tool-holding and tool-operating arrangement is shown in FIGS. 7 and 8. These show that the tools comprise a tubular tool-housing 100 having, on its outer surface, a plurality of "detents" 104. Tool insertion is achieved by longitudinally sliding housing 100 of FIGS. 7 and 8 into the annular interior space of large outer collet 82 of FIG. 6; the balls 84 of the collet seating themselves into the detent- recesses 104 of the housing—the coaction of the balls and their respective recesses holding the tool-housing firmly in the collet.

The High-Speed Tools

In the case of a high-speed tool, such as the drill-chuck of FIG. 7, its housing 100 is firmly grasped by the large collet 82 of FIG. 6; as discussed above. In the case of high-speed tools, the collet 82 does not turn; rather, it holds the housing securely in a nonrotating manner—because of the engaged clutch and the nonrotating bull-gear/pinion-gear/worm-gear assembly.

Meanwhile, the drive-pin 114 of the tool, shown in FIG. 7, fits into the driving-socket 52 of the axial high-speed driving shaft 50 shown in FIG. 6. Thus, the drill may be rotated at a high speed; while the housing is stationary, and acts as a bearing.

It is readily apparent that a plurality of different types of high-speed tools can be used with the disclosed apparatus. Among these is, for example, a jet-pump that fits the apparatus as described above; and is driven by the high-speed shaft to produce a jet that blows away debris.

The High-Torque Tools

Other tools, however, are designed for high-torque operation. They have similar housings that are similarly grasped by the large collet 82 as described above; but the high-torque tools—as exemplified in FIG. 8—do not have the driving-pin 114 previously described. Rather, the housings of the high-torque tools are rotated by the large balls 84 of the large outer-collet 82 shown in FIG. 6. In this way the tools are protected by the previously described overriding clutch. Among the high-torque tools available are wrenches, valve openers and closers, drills, thread-tappers, and arrangements for lifting and lowering.

Stroking-Mode Tools

The tools thus far described have been of the type adapted for rotation; but the disclosed arrangement also comprises a "-stroking" or a hammering operation. (See FIG. 8). The stroking-tool may have a similar tubular-housing 100 that is similarly grasped by the balls 84 of the outer collet 82. However, the stroking-tool has an additional stroking-element (not visible) that is grasped by the balls 106 of the inner collet 108 of FIG. 6.

In the stroking mode of operation, the inner collet 108-—and its attached stroking-element—is moved forward and backward in a longitudinal manner. This motion is achieved, in FIG. 6, by means of a pressurized fluid introduced through an inlet channel 120; the pressurized fluid acting upon piston-portion 122 in the manner of a piston/cylinder arrangement-—so that collet 108 is moved forward. Piston-portion 122 may then retract collet 108 to its normal position by admitting pressurized fluid into channel 124; thus driving piston 122 and collet 108 backwards to the collet's normal position. In this way, a longitudinal stroking movement can be produced-—without any rotation; the previously described housing structure acting as a guide for the stroking mode of operation.

FIG. 8 shows a hook-tool 126 that is used with the stroking mode of operation. Hook-tool 126 comprises a housing 100 that contains the previously described detents 104 on its outer surface, a spine 128 and a fixed hook-portion 130 that is affixed to housing 100, and a movable anvil 132 that is affixed to the movable stroking-element that is grasped by the inner collet 108. The coaction between hook-portion 130 and anvil 132 performs a grasping and/or a squeezing action; and the entire hook-tool may be rotated with its grasped load.

Tools to be used with the stroking-mode of operation include a cable cutter, a hammer, an impact wrench, and a stud-gun; and this mode lends itself to pushing, pulling, squeezing, and cutting.

It should be noted that the symmetry of design permits reversible operations such as tightening/loosening, pushing/pulling, raising/lowering, squeezing/stretching, etc. for both right-handed and left-handed operations.

It is apparent that in the illustration of FIG. 6, balls 84 and 106 must be mounted in such a way that they will move to allow insertion and withdrawal of the tool-housing; but will be immobile during tool usage. For clarity of drawing, no ball-holding arrangement has been shown—but many different types of collets are available; the most desirable types being those wherein a piston retracts to allow ball-movement, and then advances to hold the balls in place. One such type of collet uses a variable hydraulic pressure, and another type uses resilient materials.

The disclosed apparatus is particularly useful in underwater operations performed by a submersible. As indicated above, the particular disclosed mechanism is adapted for various types of operations; and it therefore becomes desirable to be able to pick up or reject any of a plurality of tools.

Various tools may be positioned on a tool rack onto which they slide to be held—housing upwards—by means of a tool-flange. Once the tools are properly positioned in the tool-rack, the mechanism of FIG. 6 may be positioned over any desired tool; and when forced down over the tool-housing, the balls engage in their respective detent-recesses as previously described. It should be noted that recesses 102 of FIGS. 7 and 8 are so numerous, and so closely spaced, that ball-engagement is immediate and positive. At this time the tool is removed by causing the FIG. 6 mechanism to slide the tool outwardly off the rack—using the tool-flange as a guide; and the mechanism and tool are then ready for use.

In order to release the tool, the tool is slid back onto the tool-rack; and becomes anchored thereto. Now the assembly of FIG. 6 is pulled away from the housing of the anchored tool; and the detents release the tool—which then remains anchored to the tool rack.

What I claim is:

1. An overriding clutch comprising:
   A. an engageable clutch-member;
   B. engaging-means for engaging and disengaging said clutch-member,
      said engaging-means comprising
      a. a toggle-element having at least one shoulder and pivot-pin means for permitting said toggle-element to pivot;
      b. spring-means for providing and engaging-pressure to a said clutch-member;
      c. pressure-means, positioned between said spring-means and said toggle-element, for transmitting said engaging-pressure from said spring-means to said shoulder of said toggle element, for holding said toggle-element in a normal orientation;
      d. means mechanically linking the pivot-pin of said pivot-pin means and said clutch-member, for transmitting said engaging pressure from said pivot-pin to said clutch-member for providing a normally engaged clutch, when said toggle-element is in a normal orientation;
      e. pivotal-means for producing pivotal movement of said toggle-element, said pivotal means comprising an abutment-portion and a stop-portion—whereby when said toggle-element pivots to an abnormal orientation, said pivotal-means causes said pivot-pin to move to an abnormal position, and causes said pivot-pin to disengage said clutch-member;
      f. said spring-means acting through said pressure-means and said shoulder to normally hold said toggle-element in its normal orientation to engage said clutch, but when said spring-means force is exceeded, said toggle-element assumes an abnormal orientation to disengage said clutch.
2. An overriding clutch comprising:
   A. a driving clutch-member having a clutch-face;
   B. a driven clutch-member having a clutch-face;
   C. engaging-means for engaging said clutch-faces,
      said engaging-means comprising
      a. a toggle-element having pivot-pin means for permitting said toggle-element to pivot, and having a pair of shoulders;
      b. spring-means for providing a clutch-engaging pressure to a given one of said clutch-members;
      c. pressure-means, positioned between said spring-means and said toggle-element, for transmitting said clutch-engaging pressure from said spring-means to said shoulders of said toggle-element—whereby said toggle-element is held in a normal orientation;
      d. means, comprising a tongue integral with said given clutch-member, for mechanically linking said pivot-pin of said pivot-pin means and said given clutch-member for transmitting said clutch-engaging pressure from said spring-means through said pressure-means, through said toggle-element, through said toggle-pin, and through said tongue to said given clutch-member to provide a normally engaged clutch.
3. The combination of Claim 2 including pivotal-means, comprising an abutment-bortion on said toggle-element and a fixedly positioned stop-portion for producing a pivotal movement of said toggle-element.
4. An overriding clutch comprising:
   A. a driving clutch-member having a clutch-face;
   B. a driven clutch-member having a clutch-face, and having a plurality of tongues;
   C. engaging-means for engaging said clutch-faces said engaging-means comprising
      a. a like plurality of toggle-elements each having a pivot-pin and a pair of shoulders;
      b. spring-means for providing a clutch-engaging pressure to said driven clutch member;
      c. pressure-means having a plurality of ears, positioned between said spring-means and said toggle-element for transmitting said engaging-pressure from said spring-means through said paired ears to said shoulders of said toggle elements—whereby said toggle-element are held in a normal orientation;
      d. means, comprising said tongues, for mechanically linking respective said toggle-pins and said driven clutch-member, for transmitting clutch-engaging pressure from said spring-means through said paired ears of pressure-means, through said toggle-elements, and through said toggle-pins to said driven clutch-member to provide a normally engaged clutch;
      e. pivotal-means, comprising abutment-portions on respective toggle-elements and a fixedly positioned stop-portion, for producing a pivotal movement of said toggle-elements—whereby when said toggle-elements rotate to an abnormal orientation, said pivotal-means moves said pivot-pins to an abnormal position and retracts said toggle-pin/clutch-member arrangement.
5. An overriding clutch comprising:
   A. a driving clutch-member having a first clutch-face;
   B. a substantially circular driven clutch-member having a second clutch-face, and having a plurality of circularly positioned tongues;
   C. engaging-means for engaging said clutch-faces
      said engaging-means comprising
      a. a like plurality of toggle-elements each having a pivot-pin means for allowing said toggle-elements to pivot around respective pivot-pins, said toggle-elements also having a pair of shoulders;
      b. spring-means for providing a clutch-engaging pressure to a said driven clutch members;
      c. substantially circular pressure-means having a like plurality of paired-ears positioned to abut respective paired-shoulders of respective toggle-elements, positioned between said spring-means and said toggle-element for transmitting said engaging-pressure from said springrmeans through said paired-ears to said paired shoulder of said toggle-elements—whereby said toggle-elements are held in a normal orientation;

d. means, comprising said tongues, for mechanically linking said pivot-pins and said driven clutch-member, for transmitting said clutch-engaging pressure from said spring-means through said paired ears of said pressure-means, to the paired-shoulders of said toggle-elements, through said toggle-elements, and through said pivot-pins to said driven clutch-member to provide a normally engaged clutch.

e. pivotal means, comprising an abutment portion on said toggle-elements and a substantially circular fixedly positioned stop-portion for producing a pivotal movement of said toggle-element.

f. whereby when said toggle-elements pivot to an abnormal orientation, said pivotal-means moves said pivot-pins to an abnormal position and retracts said toggle-pin/clutch-member arrangement—said spring-means acting through said pressure-means and said shoulders to hold said toggle-elements in their normal orientation, and when said spring-means is exceeded, said toggle-elements assume their abnormal orientations.

6. The combination of claim 5 including a rotatable tool-holder that is driven by said plurality of toggle-elements, said tool-holder having a like plurality of toggle-element receiving chambers—whereby a normal load on said tool-holder permits said spring-means to hold said toggle-elements in their normal orientations; but an abnormal load on said tool-holder causes said toggle-elements to assume abnormal orientations, and to activate said overriding clutch.

7. The combination of claim 6 wherein said driven clutch-member, said pressure-means, and said stop-portion are torroidal.

8. The combination of claim 7 wherein said fixedly positioned stop portion is adjustable.